A. BOLLEE, FILS.
VALVE GEAR.
APPLICATION FILED APR. 20, 1911.
1,062,580.
Patented May 27, 1913.
3 SHEETS—SHEET 1.
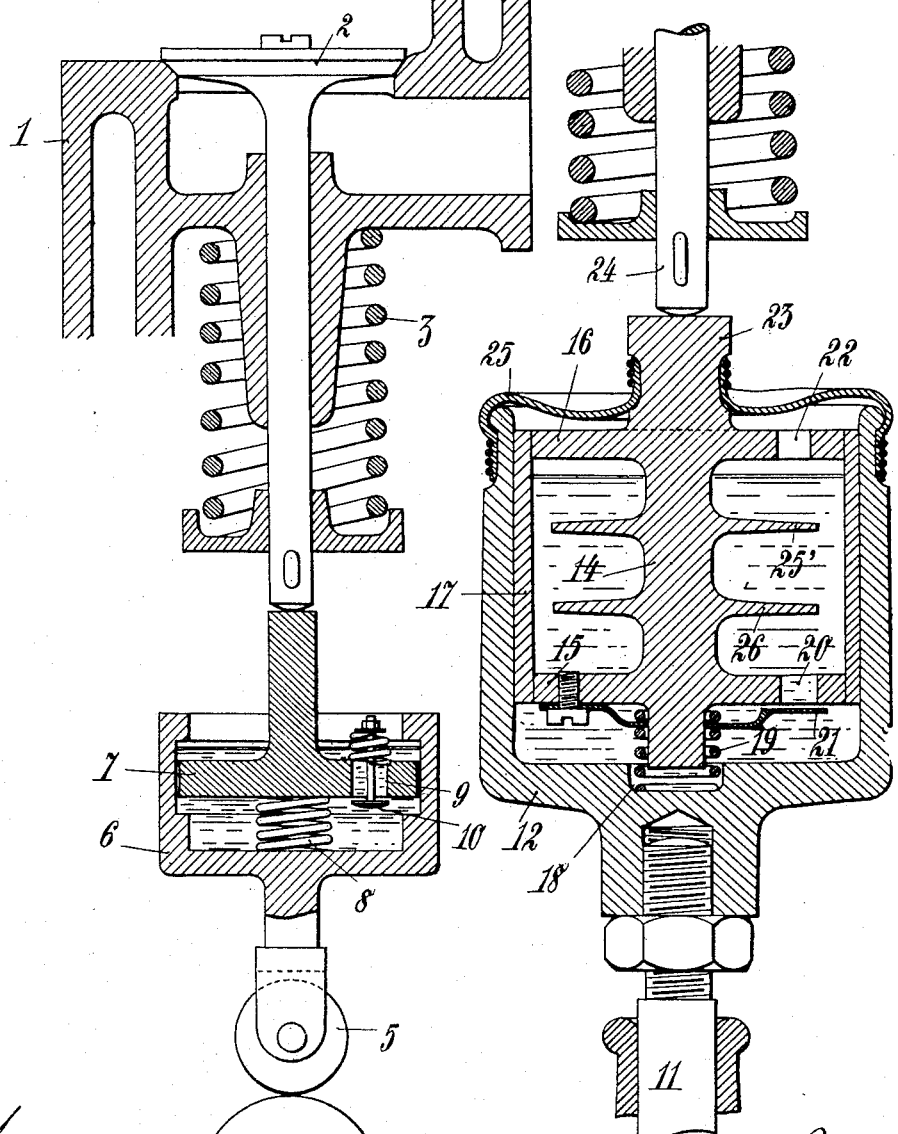

A. BOLLEE, FILS.
VALVE GEAR.
APPLICATION FILED APR. 20, 1911.
1,062,580.
Patented May 27, 1913.
3 SHEETS—SHEET 2.
Fig. 3.
Fig. 4.
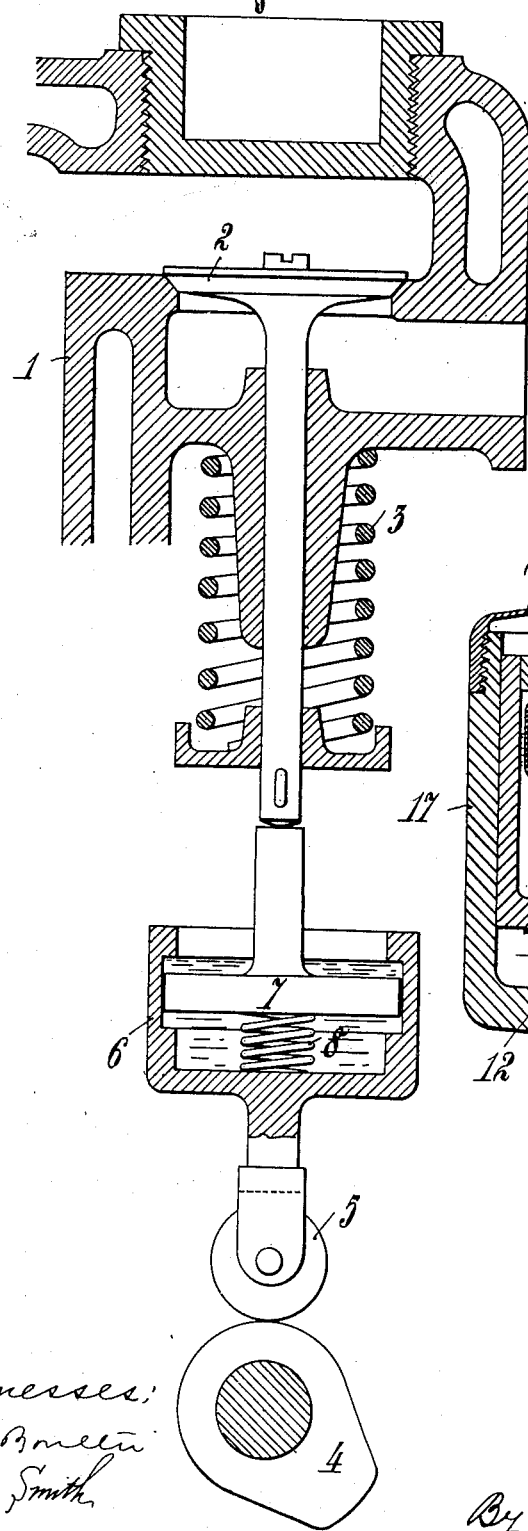
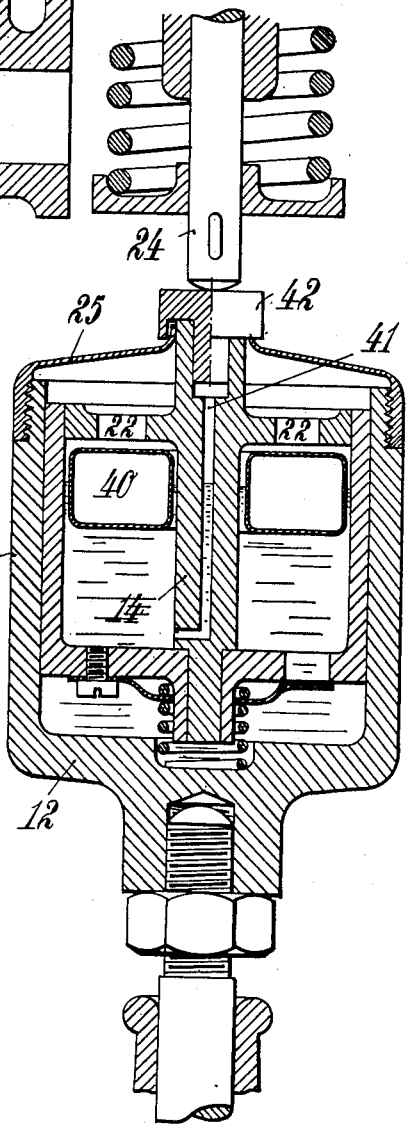
Witnesses:
H. K. Bowden
R. B. Smith
Inventor:
Amédée Bollée, fils
By Wm. E. Boulter
Attorney A. BOLLÉE, FILS.
VALVE GEAR.
APPLICATION FILED APR. 20, 1911.
1,062,580.
Patented May 27, 1913.
3 SHEETS—SHEET 3.
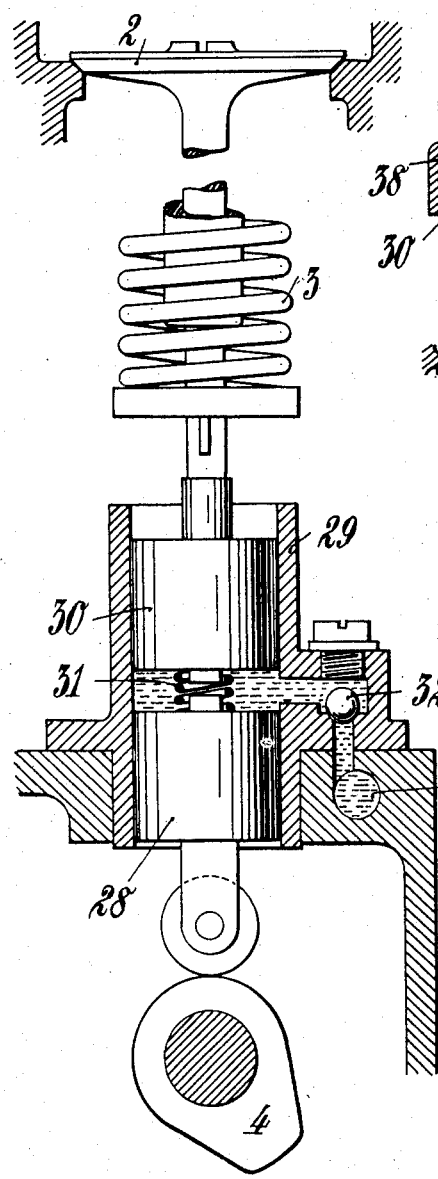
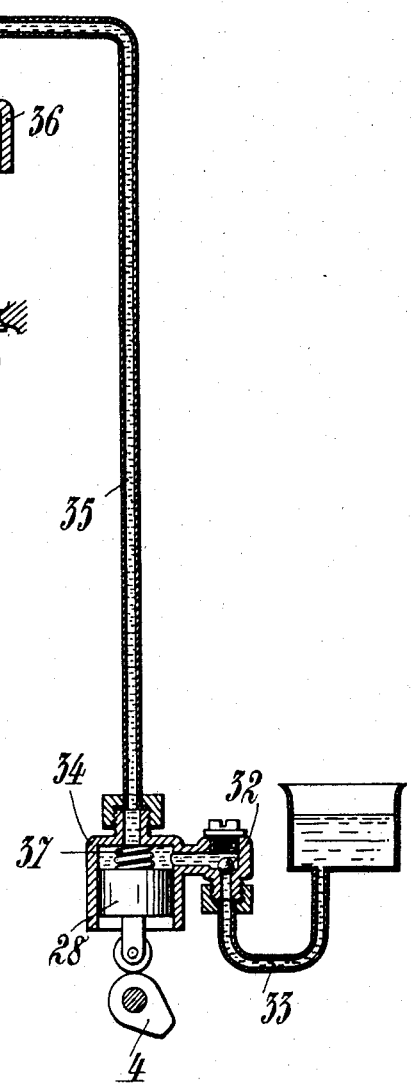

UNITED STATES PATENT OFFICE.

AMÉDÉE BOLLÉE, FILS, OF LE MANS, FRANCE.

VALVE-GEAR.

1,062,580. Specification of Letters Patent. Patented May 27, 1913.

Application filed April 20, 1911. Serial No. 622,230.

*To all whom it may concern:*

Be it known that I, AMÉDÉE BOLLÉE, Fils, a citizen of the French Republic, residing at Le Mans, France, have invented certain new and useful Improvements in Valve-Gears, of which the following is a specification.

This invention has for its object to regulate automatically the play in the control of valves such as are used in explosion engines, in such a manner that despite the disarrangement of the adjustment which may take place while traveling, the play is always reduced to a minimum without being entirely done away with, which would prevent the valves from closing in an air-tight manner.

Figure 1 shows diagrammatically the principle of the invention applied to the control of a valve of explosion engines as used for motor-cars. Figs. 2 to 5 are modified constructions. Fig. 6 shows diagrammatically another construction in which the same device can be modified so as to be used simultaneously for making up the play of the control parts and for transmitting the movement of the said parts.

1 is a partial section of the engine cylinder comprising the chest, the seat and the guide of the valve. The valve 2 is returned to its seat by the spring 3. The cam 4 driven by the engine, raises the valve and allows it to close again at suitable times, by means of a roller 5, all these parts being already well known and arranged in the ordinary manner, but the rigid part called the "lifter" which generally transmits the movements of the roller to the valve spindle is replaced by a "lifter" of variable length constituted by a small cylinder 6 connected to the spindle of the roller and rising and descending with it. This cylinder contains a suitably selected liquid. Into the cylinder is fitted a piston 7 with a slight amount of friction, immersed in the liquid. The piston is provided with an extension toward the spindle of the engine valve. A spring 8, less strong than the spring 3 of the valve, has a constant tendency to move the piston 7 away from the bottom of the cylinder 6, and consequently to increase the volume under the piston, and the total length of the lifter constituted by the whole of the roller, cylinder and piston.

The piston 7 is provided with a hole 9 which can be opened or closed by a small valve 10, which enables the liquid to pass freely from below to above the piston, but prevents the liquid contained between the piston and the cylinder end from escaping.

The stroke of the piston 7 in the cylinder 6, is limited by suitable stops, in order that the total length of the lifter thus constituted should be capable of varying to a certain extent within or beyond the exact length existing between the end of the valve of the engine in normal closed position, and the driving cam occupying the closing position. Within the limits of these stops, the piston 7 can move upward in the cylinder under the action of the spring 8, because the valve 10 opens a free passage to the liquid which passes under the piston, but the valve 10 closes as soon as pressure is exercised on the end of the piston, the imprisoned liquid preventing its descent in the cylinder. Nevertheless, as the joint of the piston is not perfectly tight and can be, if required, provided with a leak, the liquid can pass through slowly, to the upper face of the piston which can thus descend again at a suitably slow speed. The lifter constituted by the piston 7 and the cylinder 6, can therefore become lengthened under the action of the spring 8, and is capable of resisting the thrust required for raising the engine valve, as its shortening only takes place slowly.

When the valve 2 is taken out, the piston 7, under the action of the spring 8, is raised to the extent permitted by its stop and the lifter becomes too long, but after the replacing of the valve 2, the spring 3 exercises a pressure on the piston 7 which slowly descends again. If the cam 4 presents its raised portion or boss to the roller 5 at this time the piston will continue to descend to its lower stop, and the lifter will become too short. The engine having been started, the cam 4 allows the lifter and the valve 2 to descend again until the valve closes on its seat, whereupon the valve being stopped, the roller 5 and the cylinder 6 will continue to descend until the cam presents its smallest radius, while the piston 7 driven by the spring 8, remains in contact with the valve spindle. Thus the length of the driver is adjusted so that there is no play. When the cam raises the roller 5 and the cylinder 6, the imprisoned liquid raises the piston 7 and the valve 2, but during all the time that the said valve remains open, it exercises a pressure on the piston 7, and the liquid imprisoned under the piston, escapes slowly through the leaks, the lifter shortens, and when the valve is closed again, this slight shortening allows for insuring tight closing.

If the piston 7 were made sufficiently large, and the valve 10 oppositely arranged, the apparatus might work by traction with atmospheric pressure acting on the surface of the piston.

In Fig. 2, 11 is the ordinary spindle of the lifter, having a roller contacting the cam. The upper end of the said spindle carries the cylinder 12 in which the piston 17 is a tight sliding fit. The piston 17 comprises a central rod 14 carrying two disks 15 and 16 fastened to, and forming the ends of a cylindrical body sliding in the cylinder 12. The bottom or cover of the said cylinder is provided with a recess 18 in which is placed the spring 19. The piston is provided with a spigot for centering the spring 19, and the end of which constitutes the lower stop for the piston, for limiting its downward stroke. The lower face of the piston is provided with a hole 20 covered by a spring blade 21 acting as an automatic valve. The upper face of the piston is provided with one or more holes 22 and surmounted by a spigot 23, which engages the end of the valve stem 24 of the engine. The spigot 23 of the piston is connected to the upper edge of the cylinder 12 in an air-tight manner by a flexible diaphragm 25, such play being allowed that the piston can reciprocate in the cylinder to a small extent. The receptacle or tank thus formed is almost completely filled with glycerin or other suitable liquid. Small disks 25' and 26 carried by the central rod of the piston, are provided to prevent the liquid from becoming converted into an emulsion during its rapid movement.

It will be seen that the construction above described can be applied directly to any valve, without making any other changes in the construction of the engine.

In the modified construction shown in Fig. 3, the disks 25' 26 are replaced by an inner float 40 fitting within the tank 17 and exposed to atmospheric pressure through the upper orifices 22. The rod 14 of the piston has a conduit 41 therein opening into the tank 17, so that, after the removal of the plug 42, upon which rests the valve spindle 24, it is possible to introduce a suitable quantity of liquid to compensate for leakages and losses. The cylinder 12 is closed by a metal cover 25 having a central collar which surrounds the spigot of the piston and engages beneath the circular flange of the closing plug 42.

In the construction shown in Fig. 4, it will be seen that the valve 10 or 21, with which the adjustable piston 7 or 17 is provided, may be omitted, the liquid being then introduced beneath the latter during the extension of the lifter through the leaks between the piston and the cylinder. The spring 8 must be stronger than is necessary with a valve in the piston, although less strong than the valve-spring 3. The depression produced under the piston 7 by the spring 8, must not however exceed a certain value per unit of surface for the temperature of the liquid becomes fairly high owing to the close proximity of the engine, and an excessive depression would produce gas or steam bubbles under the piston 7, the elasticity of such bubbles producing in the control gear a permanent play contrary to the object in view. In order to limit the depression, it is only necessary to give the piston 7 sufficient surface.

In the construction shown in Fig. 5, the lifter of variable length, consists of two independent pistons 28 and 30 which are a tight sliding fit in a fixed cylinder 29. Between the two pistons is arranged a spring 31 tending to move them away from each other. The tension of this spring is less than that of the spring 3. The space comprised between the two pistons, is filled with a liquid supplied through a pipe or conduit 33 and passing through the check valve 32. The operation of the parts in this construction is as follows: Under the action of the spring 31, the pistons 28 and 30 are held apart in the lengthened position of the lifter. This lengthening is effected during a portion of the closing period of the engine valve, so that any play due to the action of the suction then produced by the two pistons 28 and 30, is prevented by the liquid entering through the small automatic valve 32. The slow shortening of the lifter is effected owing to slight leakages of the liquid which take place while the said liquid is under pressure, that is to say, during the period of opening of the engine valve. This shortening produces enough play to insure tight closing of the valve, which play is removed by a lengthening of the lifter taking place during the closing period of the said valve. The spring 31 need not be provided if the liquid is exposed to sufficient pressure in the conduit 33. The pistons 28 and 30 can be of different diameters, in order to impart to the valve a longer stroke for a short stroke of the cam, or vice-versa.

In the construction shown in Fig. 6, the piston 28 controlled by the cam 4, is arranged in a cylinder 33, the cover of which receives the liquid through an automatic valve 32, and communicates by means of a conduit 35 with another cylinder 36 in which is arranged the piston 30 acting on the valve 2. Springs 37 and 38 are arranged between the pistons 28 and 30, and the covers of their respective cylinders 34 and 36, in order to keep them always in contact with the driving parts and the parts to be driven. In this construction the parts are used not only for taking up play automatically, but also for connecting the parts if arranged at a distance, whatever be their relative positions. It will be understood that arrangements should preferably be made for protecting the pistons 28 and 30 from dust and for collecting the liquid escaping from the leaks.

It will be obvious that the invention can be carried out with various forms and dimensions of valves which are most suitable for the construction of the particular class of engine. Suitable means could be provided for working the apparatus by traction, while allowing the liquid to work with compression. The axes of the piston and of the cylinder are not necessarily vertical, and the apparatus would work in the same manner if it were arranged horizontally or obliquely, if the control of the valve required it. It would only be necessary to design the apparatus so as to keep the liquid in contact with the two faces of the piston. The tank containing the liquid and the piston acting on the said liquid, could also be shaped otherwise than cylindrical, which is the easiest to obtain and therefore preferable. The automatic valve could be associated with the cylinder instead of the piston in those constructions requiring it.

The apparatus can be arranged at any point in the valve driving mechanism, that is, in any place where it can, by shifting the piston, remove the play during a part of the closing period of the valve, and allow such play to be produced again slowly, during the opening period.

Any desired liquid can be used, for instance, lubricating oil, and if the apparatus is placed in the interior of the crank case, the oil can be supplied to it continuously by the splashing of the connecting rods or through inlet conduits, branches on the lubricating pipe or otherwise arranged.

What I claim as my invention and desire to secure by Letters Patent is:

1. The combination with a valve, a valve spring and means for operating said valve, of a cylinder adapted to contain a fluid and engaged by said valve operating means, a piston within said cylinder and contacting said valve, means for limiting the travel of the piston in both directions and a resilient body exerting pressure on said piston and oppositely of said valve spring, a liquid in the cylinder and means for enabling the liquid comprised between the cylinder and the corresponding piston to pass over the latter and conversely, for the purpose specified.

2. The combination with a valve, a valve spring and means for operating said valve, of a cylinder having a stem projecting therefrom and engaged by the valve operating means, a fluid and a piston immersed therein within said cylinder, a rod projecting from said piston and engaging the stem of the valve, means for limiting the travel of the piston in both directions and a spring interposed between the piston and the end of the cylinder adjacent the valve operating means, a liquid in the cylinder and means for enabling the liquid inclosed between the cylinder and the corresponding piston to pass over the latter and conversely, for the purpose specified.

3. The combination with a valve, a valve spring and means for operating said valve, of a cylinder adapted to contain a fluid and engaged by said valve operating means, a piston within said cylinder and connecting said valve, means for limiting the travel of the piston in both directions, a liquid in the cylinder, a clearance provided between the cylinder and the piston for enabling the liquid to pass over the latter, a valve in the piston for enabling the liquid to reënter the cylinder, and a resilient body exerting pressure on said piston and oppositely of said valve spring, for the purpose specified.

4. The combination with a valve, a valve spring and the means for operating said valve, of a cylinder adapted to contain a fluid, a hollow piston within said cylinder and contacting said valve, a liquid in the cylinder and in the hollow piston, means adapted to prevent the liquid forming an emulsion, a clearance provided between the cylinder and the piston for enabling the liquid to pass over the latter, a valve in the piston for enabling the liquid to reënter the cylinder, and a resilient body exerting a pressure on said piston and oppositely of said valve spring, for the purpose specified.

5. The combination with a valve, a valve spring and means for operating said valve, of a cylinder adapted to contain a fluid, a hollow piston within said cylinder and contacting said valve, a liquid in the cylinder and in the hollow piston, means adapted to prevent the liquid forming an emulsion, a clearance provided between the cylinder and the piston for enabling the liquid to pass over the latter, a valve in the piston for enabling the liquid to reënter the cylinder, a conduit for insuring a supply of the fluid to the cylinder, and a resilient body exerting pressure on said piston and oppositely of said valve spring, for the purpose specified.

6. The combination with a valve, a valve spring and means for operating said valve, of a fixed cylinder, a sliding piston forming one cylinder-end, a stem projecting from said piston and engaged by the valve operating means, another piston within said cylinder, a rod projecting from said second piston and engaging the stem of the valve, a resilient body exerting pressure between the pistons, a liquid in the cylinder between the two pistons, means for enabling the liquid to pass between the cylinder and the pistons, a reservoir for introducing the liquid in the cylinder and between the pistons, and a valve enabling only the escape of the liquid from the reservoir into the chamber placed between the pistons, for the purpose specified.

7. The combination with a valve, a valve spring and means for operating said valve, of a fixed cylinder adapted to contain a fluid and a piston engaged by the valve operating means, a second cylinder adapted to contain a fluid and a piston contacting the stem of said valve, springs exerting pressure on the inner sides of said pistons, a conduit joining said cylinders, means for enabling the liquid to pass between the pistons and their cylinders, a reservoir communicating by a conduit with the space comprised between the pistons for enabling the liquid to reënter the cylinders, and a valve which opens only for effecting the escape of the liquid from the reservoir to the cylinders, for the purpose specified.

In testimony whereof I have signed my name to this specification in the presence of two subscribing witnesses.

AMÉDÉE BOLLÉE, Fils.

Witnesses:
  H. C. Coxe,
  Georges Bonneuil.